United States Patent
Meure et al.

(10) Patent No.: US 11,400,661 B2
(45) Date of Patent: Aug. 2, 2022

(54) COMPOSITE PART RESIN INFUSION WITH DYNAMIC THICKNESS CONTROL

(71) Applicant: The Boeing Company, Chicago, IL (US)

(72) Inventors: Samuel James Meure, Keysborough (AU); Ian Cuckson, Altona Meadows (AU); Jessica Claire Orr, Newport (AU); Christopher Howe, Albert Park (AU)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 16/238,157

(22) Filed: Jan. 2, 2019

(65) Prior Publication Data
US 2020/0207034 A1    Jul. 2, 2020

(51) Int. Cl.
*B29C 70/44* (2006.01)
*B29C 43/12* (2006.01)

(52) U.S. Cl.
CPC ............ *B29C 70/443* (2013.01); *B29C 43/12* (2013.01)

(58) Field of Classification Search
CPC .............................. B29C 70/443; B29C 43/12
See application file for complete search history.

(56) References Cited

U.S. PATENT DOCUMENTS

| | | | |
|---|---|---|---|
| 6,506,325 B1 | 1/2003 | Cartwright | |
| 7,334,782 B2 | 2/2008 | Woods et al. | |
| 9,675,990 B2 * | 6/2017 | Ellis | B29C 70/54 |
| 2014/0316551 A1 * | 10/2014 | Ellis | G01N 27/90 700/127 |
| 2017/0100894 A1 | 4/2017 | Burns | |
| 2017/0348920 A1 * | 12/2017 | Roberts | B29C 70/548 |
| 2018/0319046 A1 | 11/2018 | Johnson | |

FOREIGN PATENT DOCUMENTS

| | | |
|---|---|---|
| DE | 102010037849 | 3/2012 |
| DE | 102010037849 A1 | 3/2012 |
| GB | 2502257 | 11/2013 |
| GB | 2502257 A | 11/2013 |
| JP | 2013075471 | 4/2013 |

(Continued)

OTHER PUBLICATIONS

European Search Report; Application EP19210966; dated May 26, 2020.

(Continued)

*Primary Examiner* — Niki Bakhtiari
*Assistant Examiner* — Nicholas J Chidiac (57) ABSTRACT

Systems and methods are provided for fabricating composite parts. One embodiment is a method of fabricating a composite part. The method includes providing a preform on a tool mandrel, positioning sensors around the preform according to a target shape of the composite part, and sealing the preform with a vacuum bag to form a chamber. The method also includes applying temperature and pressure to the chamber to infuse a resin into the preform to create a composite preform undergoing infusion, monitoring a thickness of the composite preform prior to completing cure, and adjusting at least one of the temperature and the pressure prior to completing cure based on the thickness.

20 Claims, 5 Drawing Sheets

(56) References Cited

FOREIGN PATENT DOCUMENTS

| | | | |
|---|---|---|---|
| JP | 2013075471 A | * | 4/2013 |
| JP | 2013075471 A | | 4/2013 |
| WO | 2011022459 A2 | | 2/2011 |
| WO | WO2018170314 | | 9/2018 |

OTHER PUBLICATIONS http://www.compositesworld.com/articles/spirit-aerosystems-prestwick-scotland-uk.
EPO, Examination Report, Application No. 19210966.8, dated Sep. 21, 2021.
EPO, European Search Report for Appl. No. EP 19210966.8 dated May 5, 2022.

* cited by examiner

COMPOSITE PART RESIN INFUSION WITH DYNAMIC THICKNESS CONTROL

FIELD

The disclosure relates to the field of composite parts, and in particular, to resin infusion of composite parts.

BACKGROUND

Aircraft parts, such as wing components, often comprise composite parts made by a resin infusion process in which a stack of porous material (known as a preform) is filled with a liquid resin. After infusion, the resin matrix is cured to solidify the combined material into a unified rigid composite. The result is a cost-effective way of manufacturing structural materials that exhibit enhanced physical characteristics (e.g., strong, lightweight, resistive to harsh environments, etc.) useful for high-performance applications such as aerospace.

In present resin infusion techniques, a profile of temperature and pressure is set to enable the resin to flow into and fill the preform. After infusion is complete, the profile ramps up the temperature to cure, then cools after cure for demolding the composite part. However, even when adhering closely to the prescribed profile of temperature and pressure, numerous variables can cause the cured thickness of the part to fall outside the strict design tolerances of the part.

The production of a composite part with even a slightly non-conforming thickness is very expensive, as it requires either costly shim or rework procedures to properly fit and assemble the part, or scrap of the part altogether. Current resin infusion techniques produce composite parts with variations in thickness that can lead to high rejection and scrap rate of parts. Therefore, composite part manufacturers seek improvements in producing parts with resin infusion where the final cured thickness consistently meets strict tolerance requirements to mitigate need for shim or rework.

SUMMARY

Embodiments described herein provide dynamic thickness control of a composite part. Key variables, such as resin viscosity and partial pressure, that are subject to change over the course of infusion, and in the transition period between infusion and cure, may cause an inconsistent per ply thickness and fiber volume fraction across the cured part and between batches of parts manufactured. Accordingly, a network of sensors are positioned around the preform to monitor the thickness of the resin-infused preform during infusion and/or in the transition period between infusion and cure. The sensors generate data for thickness and feedback to a control process. The control process calculates, according to a given material system (e.g., resin and reinforcement) a change in the applied pressure and/or heat up rate to meet a given thickness. The calculation is based on an empirical body of work that correlates cured part thickness of a given resin and reinforcement to the applied pressure, viscosity, and temperature profile. The applied pressure and temperature are thus varied in-situ during the infusion and/or in the transition period between infusion and cure to ensure that the cured thickness is controlled to fall within a given tolerance range when it is cured.

One embodiment is a method of fabricating a composite part. The method includes providing a preform on a tool mandrel, positioning sensors around the preform according to a target shape of the composite part, and sealing the preform with a vacuum bag to form a chamber. The method also includes applying temperature and pressure to the chamber to infuse a resin into the preform to create a composite preform undergoing infusion, monitoring a thickness of the composite preform prior to completing cure, and adjusting at least one of the temperature and the pressure prior to completing cure based on the thickness.

A further embodiment is a composite fabrication system including: a tool mandrel configured to support a preform of fiber layers, a vacuum bag configured to seal to the tool mandrel, and to enclose the preform to form a chamber, a heat source configured to control a temperature to the chamber, a pressure source configured to apply a pressure to the chamber, and a resin supply configured to supply the resin into the preform via the heat and the pressure applied to the chamber, wherein infusion of the resin into the preform creates a composite preform undergoing infusion. The composite fabrication system including: sensors disposed around the preform according to a target shape of a composite part, and configured to monitor a thickness of the composite preform prior to completing cure. And a controller configured to direct an adjustment of at least one of the temperature and the pressure prior to completing cure based on the thickness of the composite preform measured by the sensors.

Another embodiment is a method of fabricating a composite part. The method includes providing a preform on a forming tool, positioning sensors around the preform to measure a thickness of the preform infused with resin, and infusing the resin into the preform according to a profile of temperature and pressure. The method further includes monitoring a thickness of the preform infused with the resin during a transition period between infusion and cure, analyzing the thickness of the preform with respect to historical data of prior composite part fabrications, predicting a cured thickness of the preform based on the analyzing of the thickness with respect to the historical data, and adjusting the profile of temperature and pressure during the transition period between infusion and cure based on the predicted cured thickness of the preform.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
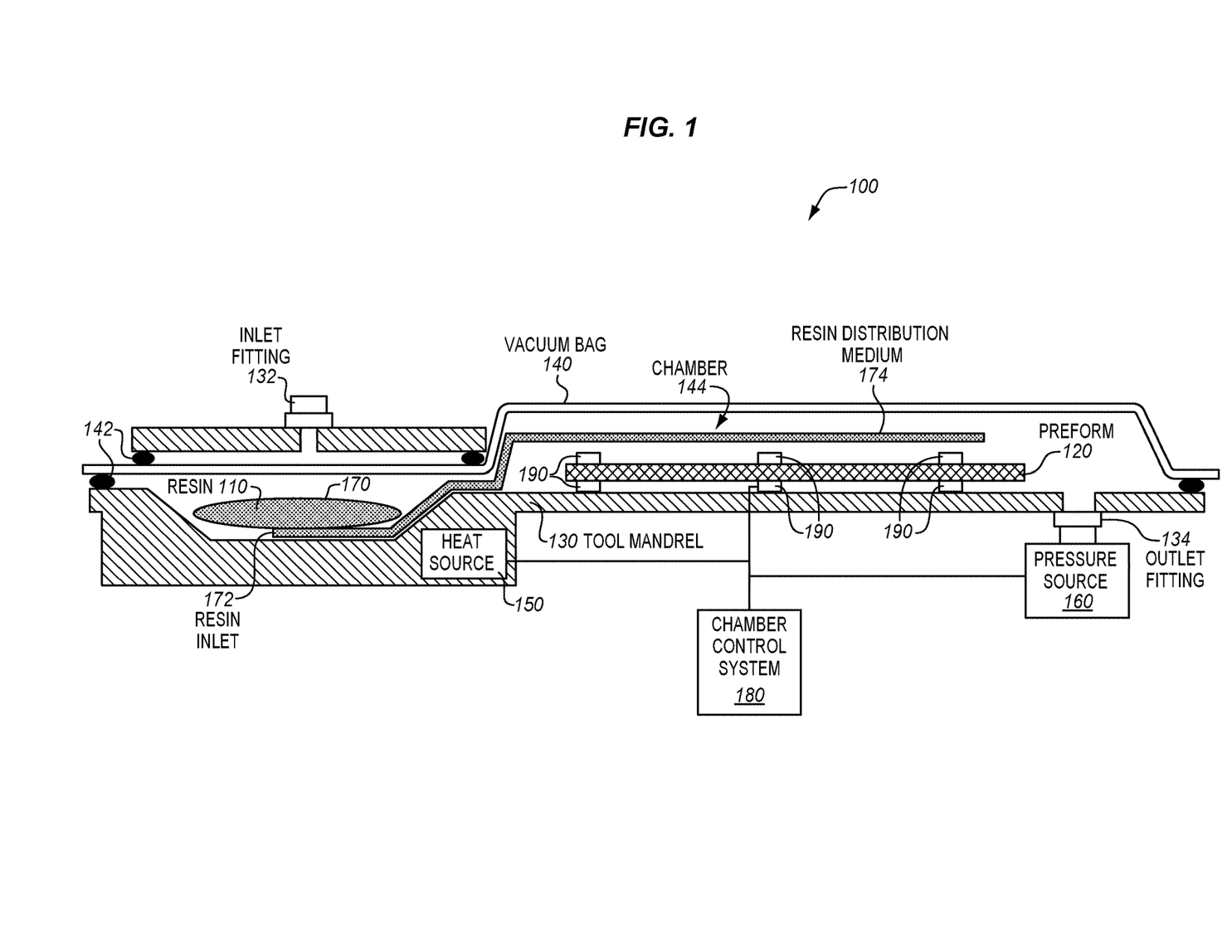
FIG. 1 is a side view diagram of a composite fabrication system in an illustrative embodiment.

FIG. 1 is a side view diagram of a composite fabrication system 100 in an illustrative embodiment. The composite fabrication system 100 is configured to manufacture composite structures, such as a composite part of an aircraft. In doing so, the composite fabrication system 100 applies heat and pressure to infuse a resin 110 into a preform 120. After the resin is infused, the composite fabrication systems 100 cures the resin-infused material into a hardened structure, thereby creating the desired composite part.

Generally, the composite fabrication system 100 includes a tool mandrel 130, a vacuum bag 140, one or more heat source(s) 150, one or more pressure source(s) 160, a resin supply 170, and a chamber control system 180. The tool mandrel 130 (sometimes referred to as a mandrel, mold tool, or forming tool) provides a base or surface which supports the preform 120. The preform 120 may include layers or plies of fibers, such as carbon fibers or fiberglass fibers, that are laid-up on the tool mandrel 130 and placed under the vacuum bag 140. The vacuum bag 140 seals to the tool mandrel 130 via sealing members 142, and encloses the preform 120 to form a chamber 144.

During infusion, the chamber control system 180 controls the heat source(s) 150 and the pressure source(s) 160 to apply heat and pressure to the chamber 144, thereby causing the resin 110 to flow from the resin supply 170 and into the preform 120 via a resin distribution medium 174. The pressure source(s) 160 (e.g., vacuum pump) couple with an inlet fitting 132 and/or an outlet fitting 134 to create a pressure differential that draws the resin 110 from the resin supply 170 and into a resin inlet 172 of the resin distribution medium 174. The resin distribution medium 174 typically includes a channel with resin outlets and/or a permeable membrane to enable the resin 110 to flow and distribute into the preform 120. After the preform 120 is sufficiently infused with the resin 110, the preform 120 may be cured with a curing temperature and/or pressure to form the composite part.

In previous fabrication systems, the infusion and the cure are performed according to a predetermined profile of temperature and pressure. However, even if the predetermined course of temperature and pressure is closely followed, numerous key variables can undesirably affect the final thickness of the composite part. Examples of key variables including a resin viscosity, partial pressure, oven airflow, and tool design. For instance, even if the infusion pressure applied to the resin reservoir is constant, the partial pressure ahead of the resin flow front and within the preform is subject to change over the course of infusion due to the presence of moisture and a rise in temperature. Additionally, the resin viscosity may also change during infusion due to the thermally activated chemical reaction of the resin.

The composite fabrication system 100 is therefore enhanced with sensors 190 configured to measure a thickness of the preform 120 infused with the resin 110. Using data generated by the sensors 190, the chamber control system 180 is configured to adapt the heat source(s) 150 and/or pressure source(s) 160 to dynamically adjust the temperature/pressure in the chamber 144 prior to completing the cure process of the composite part. This ensures that the thickness of the final composite part meets a given tolerance according to the design specification of the part. The composite fabrication system 100 thus provides a technical benefit in reducing or eliminating costly shim or rework procedures as well as fabrication waste resulting from out of tolerance part thickness.

Generally, the sensors 190 are positioned around the preform 120 to monitor the thickness of the preform 120 infused with the resin 110. In the period during infusion and after infusion but before cure, the preform 120 infused with the resin 110 may be referred to as a composite preform. After cure, the preform 120 infused with the resin 110 may be referred to as a composite part. In one embodiment, the sensors 190 are positioned around the preform 120 at locations where part thickness of the composite part is to be verified post cure. That is, the sensors 190 may be strategically located to represent the desired thickness and/or target shape of the composite part. The thickness may include a dimension of the part across any direction of the part as desired, and multiple thickness locations may be analyzed.

In one embodiment, the sensors 190 include pairs of sensors disposed on either side of the preform 120 at various locations where thickness of the final part is to be inspected for tolerance conformance (e.g., three tolerance inspection locations as in FIG. 1). The distance between a sensor pair may represent a thickness tolerance or tolerance range designed for the composite part. Alternatively or additionally, one or more sensors 190 may include a sensor configured to measure the thickness of the composite preform from one side of the preform 120. The sensors 190 may include dielectric sensors, ultrasonic sensors, or other type of sensor suitable for measuring the thickness of the composite preform.

One or more sensors 190 may alternatively or additionally be configured to measure alternative metrics such as temperature, pressure, and/or viscosity of the resin 110. The sensors 190 may alternatively or additionally be provided to the tool mandrel 130, resin distribution medium 174, vacuum bag 140, and/or various locations of the chamber 144 and preform 120. The sensors 190 may be communicatively coupled with the chamber control system 180 via one or more wired or wireless connections. Details of operation of the chamber control system 180 will be described in greater detail below.

It will be appreciated that the composite fabrication system 100 of FIG. 1 is an example fabrication system provide for discussion purposes, and that embodiments described herein may apply to numerous resin infusion variations known by various names in the industry. Examples of applicable resin infusion variations include Controlled Atmospheric Pressure Resin Infusion (CAPRI), Resin Transfer Infusion (RTI), Resin Transfer Molding (RTM), Resin Injection Molding (RIM), Vacuum-assisted Resin Transfer Molding (VaRTM), and Vacuum Infusion Process (VIP). Accordingly, additional or alternative components of the composite fabrication system 100 are possible, including alternative resin reservoir storage and delivery mechanisms, alternate pressure source connections and locations, alternative heat source components (e.g., oven, integral, or induction heating) and locations, etc.

Additionally, the composite fabrication system 100 may include various consumable items not shown for ease of illustration, such as a peel ply, vacuum lines, breathers, etc., that may be removed and disposed after demold. Additional and alternative types and locations of resin distribution lines, vacuum bags, sealing members etc., are also possible. Though FIG. 1 illustrates simple shapes for ease of illustration, the preform 120 and resulting composite part may include complex shapes with variations of thickness across dimensions of the structure. For instance, the composite fabrication system 100 may include a caul plate and/or the tool mandrel 130 may comprise a mandrel with an inner mold line to ensure that the surfaces of the composite preform form a smooth aerodynamic surface and maintain a desired contour or shape. As such, the rate of distribution of the resin 110 into the preform 120 may be non-uniform and partially dependent upon different thicknesses across preform 120.

The preform 120 may generally comprise laminates of fibers (e.g., tape, woven and/or braided fibers) that are stacked in the desired orientations, cut and formed into the desired shape, and debulked. The preform 120 may include dry fiber materials, binderized fiber materials, or some combination thereof. The preform 120 may also incorporate additional materials such as metals, foams, adhesives, prepregs, sensors, and other specialty materials. Moreover, the preform 120 may include interlayers, or veils, of a thermoplastic (e.g., polyamide) that soften or melt as the temperature of the infused preform rises. This change in the physical state of the interlayer architecture may alter the thickness of the veil and thus lead to a change in the cured per ply thickness of the laminate to affect the cured part thickness.

The resin 110 may include any liquid resin, such as a thermoset or thermoplastic resin, that solidifies in order to harden into a composite part (e.g., for use in an aircraft). For thermoset resins, the hardening is a one-way process referred to as curing, while for thermoplastic resins, the resin may return to liquid form if it is re-heated. Thus, the resin 110 may be a polyimide, an epoxy, a thermoplastic resin, or any other resin suitable for making composite parts. Illustrative details of the operation of the composite fabrication system 100 will be discussed with regard to FIG. 2.

Figure 2:
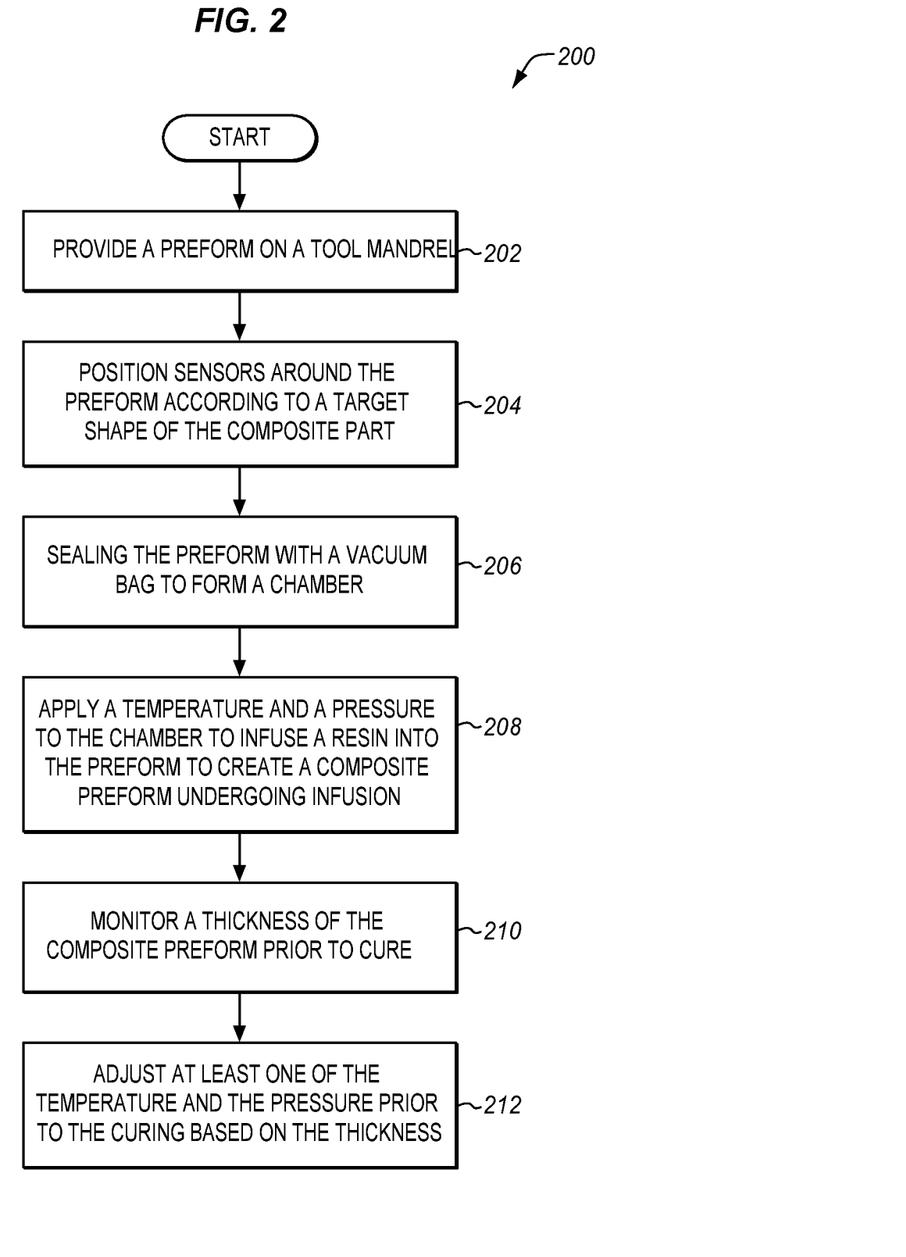
FIG. 2 is a flowchart illustrating a method for fabricating a composite part via resin infusion with dynamic thickness control in an illustrative embodiment.

FIG. 2 is a flowchart illustrating a method 200 for fabricating a composite part via resin infusion with dynamic thickness control in an illustrative embodiment. The steps of the method 200 are described with reference to the composite fabrication system 100 of FIG. 1, but those skilled in the art will appreciate that the method 200 may be performed in other systems as desired. The steps of the flowcharts described herein are not all inclusive, may include other steps not shown, and may be performed in an alternative order.

In step 202, the preform 120 is provided to the tool mandrel 130. In step 204, the sensors 190 are positioned according to a target shape of the composite part. In step 206, the preform 120 is sealed with the vacuum bag 140 to form the chamber 144. In step 208, temperature and pressure are applied to the chamber 144 to infuse the resin 110 into the preform 120 to create a composite preform undergoing infusion.

In step 210, a thickness of the composite preform is monitored prior to cure. That is, the sensors 190 may generate data of the thickness of the composite preform during infusion, during the transition period between infusion and cure, and/or during the cure cycle and prior to completing cure of the composite preform. The timing of the infusion, transition period, and cure is described in greater detail below. The sensors 190 may provide real-time feedback of the thickness of the composite preform to the chamber control system 180.

In step 212, the chamber control system 180 adjusts at least one of the temperature and the pressure prior to completing cure based on the thickness information provided by the sensors 190. The temperature/pressure are thus dynamically controlled in-situ by monitoring the thickness of the composite preform prior to completing cure and adjusting the temperature/pressure as necessary prior to completing cure. The method 200 therefore provides a substantial benefit over prior techniques by actively controlling the thickness to fall within a given tolerance range regardless of any number of uncontrolled variables that may occur which affect the final cured thickness of the composite part. Further details related to calculation of the adjusted temperature/pressure is described in greater detail below.

Figure 3:
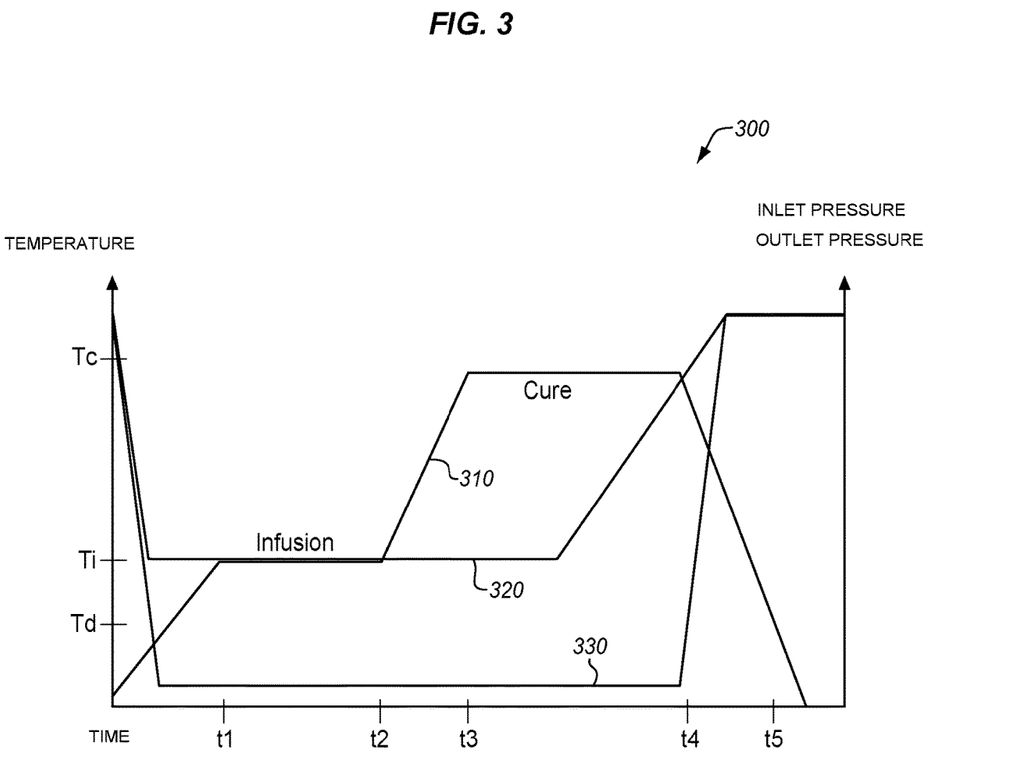
FIG. 3 illustrates a profile of temperature and pressure to apply over time for the infusion and cure of a composite part in an illustrative embodiment.

FIG. 3 illustrates a profile 300 of temperature 310 and pressure 320/330 to apply over time for the infusion and cure of a composite part in an illustrative embodiment. The chamber control system 180 is configured to direct the heat source(s) 150 and pressure source(s) 160 to apply the temperature 310, inlet pressure 320, and outlet pressure 330 of the profile 300 to control the infusion and cure as a function of time. In particular, the chamber control system 180 controls: (i) the infusion temperature, $T_i$, from time $t_1$ to $t_2$, (ii) the cure temperature, $T_c$, from time $t_3$ to $t_4$, (iii) the temperature heat-up rate between $T_i$ and $T_c$ in the transition period between infusion and cure from $t_2$ to $t_3$, (iv) the temperature cool-down rate between $T_c$ and the demold temperature, $T_d$, from time $t_4$ to $t_5$, (v) the area under the curve from time $t_1$ to $t_3$, and (vi) the inlet pressure 320 from time $t_1$ to $t_4$.

During infusion from $t_1$ to $t_2$, the pressure 320/330 applied by the pressure sources 160 draws the resin 110 from the reservoir (e.g., resin supply 170) and into the preform 120 via the resin distribution medium 174. During this process, resin is prevented from overfilling the preform 120 due to pressure from the vacuum bag 140. As the infusion progresses, the infusion rate gradually slows due to increased drag and decreased pressure as fluid wets the preform 120. That is, as described earlier, even if the infusion pressure applied to the resin reservoir is constant, the partial pressure ahead of the resin flow front and within the preform 120 is subject to change over the course of infusion due to the presence of moisture and rise in temperature. Additionally, the resin viscosity may also change during infusion due to the thermally activated chemical reaction of the resin 110.

Accordingly, even if the process parameters (i)-(vi) described above are determined in advance for producing a composite part to a given specification, key variables such as physical characteristics of the resin 110 and physical characteristics of the interlayers of the preform 120 may nonetheless affect the thickness of the cured composite part. Therefore, prior to completing cure of the part at time $t_4$, the chamber control system 180 may adjust of temperature 310 and pressure 320/330 of the profile 300 to compensate for the uncontrolled variables and bring the part back into thickness tolerance before it is cured. As described in further detail below, the chamber control system 180, in some embodiments, dynamically controls thickness in the transition period (e.g., from time $t_2$ to $t_3$) after infusion is complete but before cure begins.

Figure 4:
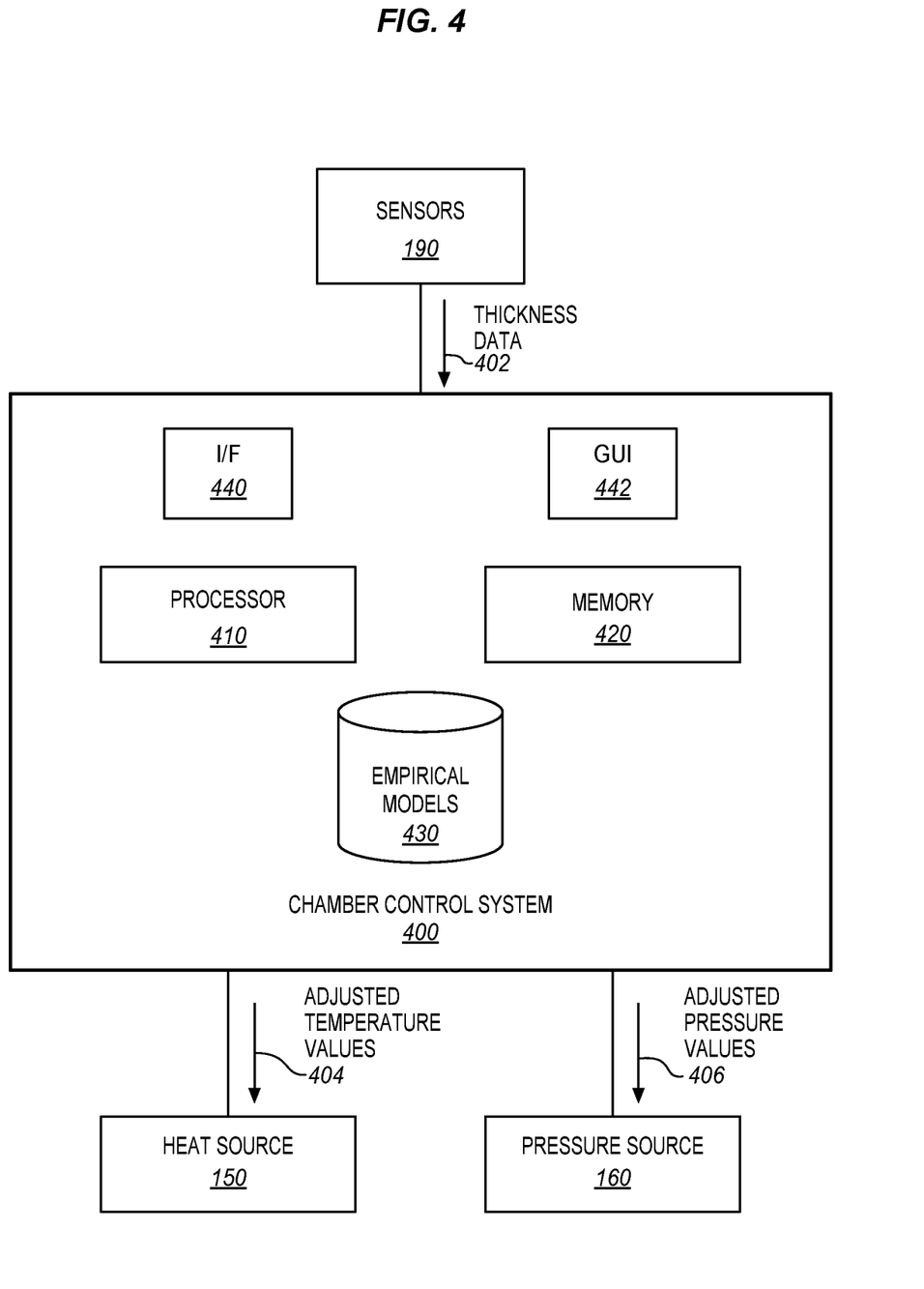
FIG. 4 is a block diagram of a chamber control system in an illustrative embodiment.

FIG. 4 is a block diagram of a chamber control system 400 in an illustrative embodiment. The chamber control system 400 is configured to receive thickness data 402 from the sensors 190, and to calculate adjusted temperature values 404 and/or adjusted pressure values 406 to apply with the heat source(s) 150 and/or pressure source(s) 160, respectively. In particular, the chamber control system 400 is configured to calculate the adjustments by referencing empirical models 430 of prior fabrications of composite parts. By collecting the thickness data 402 and processing it with respect to the empirical models 430 in real time, the chamber control system 400 is advantageously enabled to detect that an out of thickness tolerance may be present or possible, and to bring the part back into tolerance before it is cured to a final thickness.

The chamber control system 400 may comprise hardware, software, or a combination of hardware and software. For example, the chamber control system 400 may include a processor 410, which includes any electronic circuits and/or optical circuits that are able to perform functions. The processor 410 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc. The chamber control system 400 may also include memory 420 which may include any electronic circuits, optical circuits, and/or magnetic circuits that are able to store data. The chamber control system 400 may further include an interface 440 to send or receive data, and a graphical user interface 442 to display information and receive user input.

Figure 5:
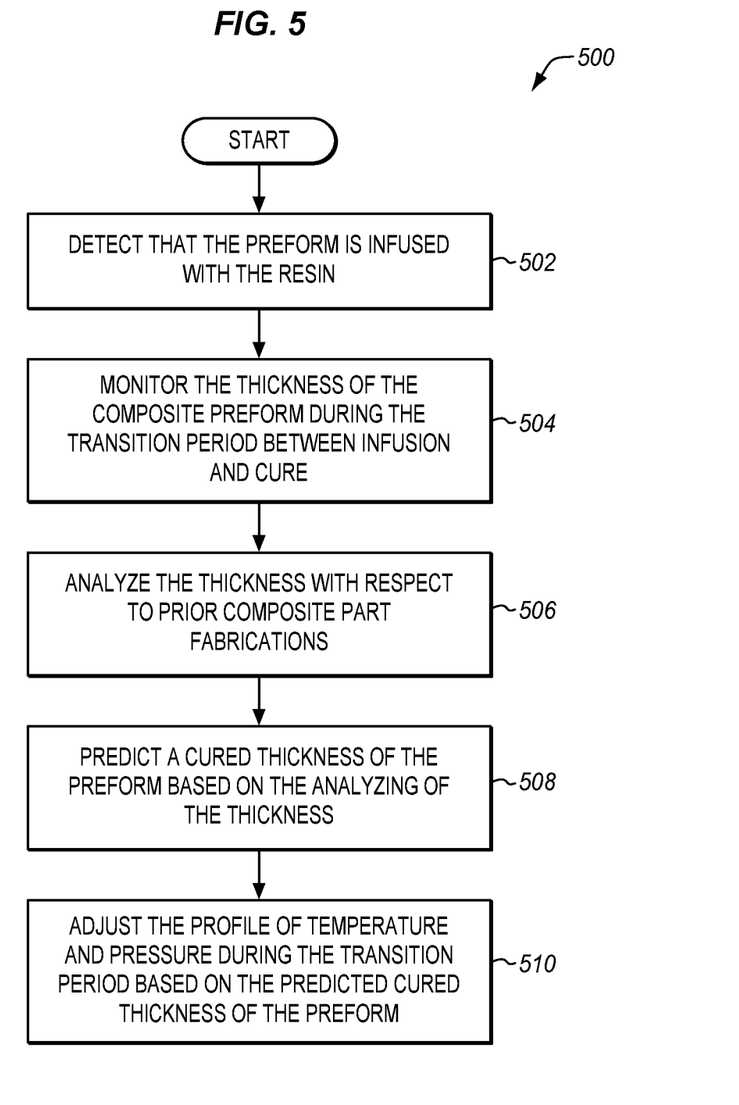
FIG. 5 is a flowchart illustrating a method for fabricating a composite part in an illustrative embodiment.

FIG. 5 is a flowchart illustrating a method 500 for fabricating a composite part via resin infusion with dynamic thickness control in another illustrative embodiment. The steps of the method 500 are described with reference to the composite fabrication system 100 of FIG. 1, the profile 300 of FIG. 3, and the chamber control system 180/400 of FIGS. 1 and 4, but those skilled in the art will appreciate that the method 500 may be performed in other systems and with alternative profiles as desired. Assume, for this embodiment, that sensors 190 have been positioned with respect to the preform 120 as desired, and that the chamber control system 400 has received the appropriate temperature/pressure profile to apply, and desired thickness tolerances for locations of the composite part. Further assume for this embodiment that the infusion process has been initiated according to the profile 300 for producing the composite part.

In step 502, the chamber control system 400 detects that the preform 120 is completely infused with the resin 110. In step 504, the chamber control system 400 monitors (e.g., via sensors 190) the thickness of the composite preform during the transition period between infusion and cure. Thus, after infusion, the chamber control system 180 may initiate processing of the thickness data 402 received by the sensors 190 in real time.

In step 506, the chamber control system 400 analyzes the thickness of the composite preform with respect to historical data of prior composite part fabrications. That is, the chamber control systems 400 may employ the empirical models 430 in processing the current thickness of the composite preform. The empirical models 430 may include historical data that correlates key physical characteristics or variables of prior composite preform characteristics with resulting cured thicknesses of prior composite part fabrications. An example of a physical characteristic of a composite preform is a specific viscosity of the resin 110 as a function of temperature. For example, the age of the resin 110, production source of the resin 110, and/or how the resin 110 has been mixed (mixture process) may contribute to the specific viscosity of the resin 110. Therefore, the chamber control system 400 may be configured to process the current thickness as a function of the physical characteristics of the resin 110 infused into the preform 120 with respect to prior physical characteristics of prior infused resins and corresponding prior thickness results. In another embodiment, the chamber control system 400 is configured to process the measured thickness as a function of the physical characteristics of the interlayer (e.g., softening temperature of the interlayer and/or permeability of the preform 120) in comparison to the physical characteristics of the prior thickness results and corresponding physical characteristics of prior preform interlayer characteristics.

Alternatively or additionally, empirical models 430 may include historical data that correlates fabrication process parameters and a cured thickness of the prior composite part fabrications. For example, sensors (e.g., sensors 190) may provide measurement values to a controller (e.g., chamber control system 400) including one or more of the thickness, a measured temperature of the chamber, a measured pressure of the chamber, a measured viscosity of the resin in the composite preform, and a time. Thus, the chamber control system 400 may process fabrication parameters in comparison to the parameters of prior fabrications, including comparisons of thickness, pressure, and temperature with respect to time. Thus, in some embodiments, the chamber control system 400 may calculate the adjusted values for at least one of the temperature and the pressure to apply prior to completing the curing based on the measurement values and a correlation in in the historical data between one or more prior measurement values (e.g., previously recorded and stored in empirical models 430) and a cured thickness of the prior composite part fabrications.

In step 508, the chamber control system 400 predicts a cured thickness of the preform based on the analyzing of the thickness with respect to the historical data. In doing so, the chamber control system 400 may detect that an out of tolerance thickness is possible based on the calculations of a predicted thickness of the composite part. In some embodiments, the chamber control system 400 may generate a notification of possible out of tolerance thickness. For example, the chamber control system 400 may raise triggers, flags, and/or a display on the graphical user interface 442 that an out of thickness tolerance may be present or possible.

Then, in step 510, the chamber control system 400 adjusts the profile of temperature and pressure during the transition period based on the predicted cured thickness of the preform. Thus, the chamber control system 400 may correct the thickness back into tolerance prior to cure completion. In other words, the chamber control system 400 is configured to control the thickness with the adjusting to produce the composite part as a cured part having a predetermined cross-sectional part thickness. Advantageously, using the method 500, the profile of temperature and pressure is adjusted during the transition period between infusion and cure to correct the thickness back into tolerance prior to cure.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method of fabricating a composite part, the method comprising:
   providing a preform on a tool mandrel;
   positioning sensors around the preform according to a target shape of the composite part;
   sealing a vacuum bag to the tool mandrel to form a chamber containing the preform;
   applying pressure to the chamber in a manner causing resin to infuse the preform to create a composite preform undergoing infusion;
   monitoring, using the sensors, measurement values of a thickness of the composite preform during at least one of the following: during infusion of the composite preform, during curing of the composite preform, and during a transition period between infusion and curing;
   analyzing the measurement values of the thickness relative to historical data of prior composite part fabrications, to predict if a cured thickness of the composite part resulting from curing of the composite preform, would fall outside of a tolerance range specified for the composite part; and
   adjusting, if it is predicted that the cured thickness of the composite part would fall outside of the tolerance range, the pressure applied to the chamber during curing of the composite preform, in a manner causing the cured thickness of the composite part to fall within the tolerance range.

2. The method of claim 1 further comprising:
   adjusting the pressure after the infusion and before the curing, in a manner ensuring that the cured thickness of the composite part will fall within the tolerance range.

3. The method of claim 1 further comprising:
   positioning the sensors around the preform at locations where the cured thickness of the composite part is to be verified.

4. The method of claim 1 further comprising:
   controlling the cured thickness of the composite part via adjusting the pressure in a manner to produce the composite part as a cured part having a predetermined cross-sectional thickness.

5. The method of claim 1, wherein analyzing the measurement values further comprises:
   calculating adjusted values for at least one of a heat and the pressure to apply to the chamber.

6. The method of claim 5 further comprising:
   calculating the adjusted values based on a correlation in the historical data between physical characteristics of composite preforms and a cured thickness of the prior composite part fabrications.

7. The method of claim 5 further comprising:
   calculating the adjusted values based on a correlation in the historical data between physical characteristics of the composite preform and a cured thickness of the prior composite part fabrications, the physical characteristics including one or more of a resin age, a resin mixture process, and a resin production source.

8. The method of claim 5 further comprising:
   providing the measurement values to a controller, the measurement values including one or more of the thickness, a measured temperature of the chamber, a measured pressure of the chamber, a measured viscosity of the resin in the composite preform, and a time; and
   calculating, with the controller, the adjusted values for at least one of the heat and the pressure to apply prior to completing cure based on the measurement values and a correlation in the historical data between one or more prior measurement values and a cured thickness of the prior composite part fabrications.

9. The method of claim 8 further comprising:
   providing characteristics of the resin used in the infusion to the controller; and
   calculating the adjusted values for at least one of the heat and the pressure to apply prior to completing cure based on the characteristics of the resin and the correlation in the historical data.

10. A method of fabricating a composite part, the method comprising:
    providing a preform on a tool mandrel having a resin reservoir containing a resin;
    positioning sensors around the preform;
    sealing a vacuum bag to the tool mandrel to form a chamber containing the preform and the resin;
    applying pressure to the chamber according to a profile of pressure applied using a vacuum pump;
    infusing the resin into the preform according to the profile of pressure applied to the chamber applied using the vacuum pump;
    monitoring, using the sensors, a thickness of the preform during at least one of the following: during infusion of the composite preform, during curing of the composite preform, and during a transition period between infusion and curing;
    analyzing the thickness of the preform relative to historical data of prior composite part fabrications, to predict if a cured thickness of a composite part resulting from curing of the preform, would fall outside of a tolerance range specified for the composite part; and
    adjusting, if it is predicted that the cured thickness of the composite part would fall outside of the tolerance range, the profile of pressure applied to the chamber via the vacuum pump during curing of the composite preform, in a manner causing the cured thickness of the composite part to fall within the tolerance range.

11. The method of claim 10 wherein:
the historical data correlates one or more of a resin age, a resin mixture process, and a resin production source with a cured thickness of prior composite part fabrications.

12. The method of claim 10 wherein:
the historical data correlates a resin viscosity with a cured thickness of prior composite part fabrications.

13. The method of claim 10 wherein:
the historical data correlates one or more of a measured temperature, a measured pressure, a measured viscosity of the resin, and a time with a cured thickness of prior composite part fabrications.

14. The method of claim 10 further comprising:
positioning the sensors around the preform at locations where the cured thickness of the composite part is to be verified.

15. The method of claim 10, wherein analyzing the thickness of the preform further comprises:
generating a notification that the predicted cured thickness of the composite part is outside of the tolerance range.

16. The method of claim 10, wherein analyzing the thickness further comprises:
calculating adjusted values for the profile of pressure to apply to the chamber.

17. A composite fabrication system comprising:
a tool mandrel configured to support a preform of fiber layers;
a vacuum bag configured to be sealed to the tool mandrel in a manner forming a chamber containing the preform;
a pressure source configured to apply a pressure to the chamber;
a resin supply configured to supply the resin to the preform via the pressure applied to the chamber to cause the resin to flow into the preform to thereby infuse the preform, wherein infusion of the resin into the preform creates a composite preform undergoing infusion;
sensors disposed around the preform according to a target shape of a composite part, and configured to generate measurement values of a thickness of the composite preform during at least one of the following: during infusion of the composite preform, during curing of the composite preform, and during a transition period between infusion and curing; and
a controller configured to:
analyze the measurement values of the thickness relative to historical data of prior composite part fabrications, to predict if a cured thickness of the composite part resulting from curing of the composite preform, would fall outside of a tolerance range specified for the composite part; and
adjust, if it is predicted that the cured thickness of the composite part would fall outside of the tolerance range, the pressure applied to the chamber during curing of the composite preform, in a manner causing the cured thickness of the composite part to fall within the tolerance range.

18. The composite fabrication system of claim 17 wherein: the historical data correlates one or more of a resin age, a resin mixture process, and a resin production source with a cured thickness of the prior composite part fabrications.

19. The composite fabrication system of claim 17 wherein: the historical data correlates a resin viscosity with a cured thickness of the prior composite part fabrications.

20. The composite fabrication system of claim 17 wherein:
the sensors are disposed at locations where the cured thickness of the composite part is to be verified.

* * * * *